United States Patent
Irwin et al.

(10) Patent No.: US 9,831,829 B2
(45) Date of Patent: Nov. 28, 2017

(54) SYSTEM AND METHOD FOR TESTING PHOTOSENSITIVE DEVICE DEGRADATION

(71) Applicant: Hunt Energy Enterprises, L.L.C., Dallas, TX (US)

(72) Inventors: Michael D. Irwin, Dallas, TX (US); Jerome Lovelace, McKinney, TX (US); Kamil Mielczarek, Rowlett, TX (US)

(73) Assignee: HEE Solar, L.L.C., Dallas, TX (US)

( * ) Notice: Subject to any disclaimer, the term of this patent is extended or adjusted under 35 U.S.C. 154(b) by 0 days.

(21) Appl. No.: 15/276,378

(22) Filed: Sep. 26, 2016

(65) Prior Publication Data

US 2017/0094142 A1     Mar. 30, 2017

Related U.S. Application Data

(60) Provisional application No. 62/232,088, filed on Sep. 24, 2015.

(51) Int. Cl.
*H02S 99/00* (2014.01)
*H02S 50/10* (2014.01)

(52) U.S. Cl.
CPC ............. *H02S 99/00* (2013.01); *H02S 50/10* (2014.12)

(58) Field of Classification Search
CPC .................................. H02S 99/00; H02S 50/10
See application file for complete search history.

(56) References Cited

U.S. PATENT DOCUMENTS

| 9,083,946 | B2 | 7/2015 | Grinberg et al. |
| 2003/0090653 | A1 | 5/2003 | Ogata |
| 2005/0057655 | A1 | 3/2005 | Duesman et al. |
| 2008/0258747 | A1 | 10/2008 | Kluth et al. |
| 2010/0236035 | A1 | 9/2010 | Chung |
| 2010/0237895 | A1 | 9/2010 | Chung |
| 2011/0139184 | A1 | 6/2011 | Cherukupalli |
| 2013/0215418 | A1 | 8/2013 | Grinberg et al. |

(Continued)

FOREIGN PATENT DOCUMENTS

| CN | 104143959 | 11/2014 |
| EP | 2587274 | 5/2013 |

(Continued)

OTHER PUBLICATIONS

PCT; Written Opinion of International Searching Authority re: PCT/US2016/053806; dated Dec. 8, 2016; 5 pages.

(Continued)

*Primary Examiner* — Michael Teitelbaum
(74) *Attorney, Agent, or Firm* — Baker Botts L.L.P.

(57) ABSTRACT

The performance of photosensitive devices over time may be tested by configuring a photosensitive device test system that includes a light source plate that exposes photosensitive devices within a container to a specified light intensity. The light intensity may be adjusted by a programmable power source according to one or more thresholds. A test may last for a set duration with performance measurements being taken at predetermined intervals throughout the duration. Feedback from the photosensitive device test system may be recorded to determine whether to increase light intensity, to stop testing, to continue testing, and whether one or more environmental conditions should be altered. Measurements may be sent to a client for analysis and display to a user.

6 Claims, 4 Drawing Sheets

(56) References Cited

U.S. PATENT DOCUMENTS

2013/0265066 A1 10/2013 Hsieh et al.
2014/0085638 A1* 3/2014 Nikiforov ............... H02S 50/10
　　　　　　　　　　　　　　　　　　　　356/435

FOREIGN PATENT DOCUMENTS

EP　　　2718697　　4/2014
WO　　2012170191　12/2012

OTHER PUBLICATIONS

PCT; International Search Report re: PCT/US2016/053806; dated Dec. 8, 2016; 3 pages.

* cited by examiner

SYSTEM AND METHOD FOR TESTING PHOTOSENSITIVE DEVICE DEGRADATION

TECHNICAL FIELD

This application relates generally to a photosensitive device degradation system, and in particular, to a system for determining the performance of a photosensitive device over time using an accelerated degradation system.

BACKGROUND OF THE INVENTION

Use of photosensitive devices, such as photovoltaic (PVs) or solar cells to generate electrical power from solar energy or radiation may provide many benefits, including, for example, a power source, low or zero emissions, power production independent of a power grid, durable physical structures (no moving parts), stable and reliable system, modular construction, relatively quick installation, safe manufacture and use, and good public opinion and acceptance of use. Other photosensitive devices may also include solar thermal cells, photodiodes, photoresistors, photocapacitors, phototransducers, and phototransistors.

However, the failure of such photosensitive devices may be costly and may require significant time to replace or repair. Testing of photosensitive devices prior to shipment or installation may be costly and may even be destructive to the photosensitive device itself. Thus, traditionally a sample of photosensitive devices would be tested to determine the performance of a given photosensitive device design or configuration.

Conventional testing of photosensitive devices to determine, for example, degradation rates, may use sulfur plasma or incandescent bulbs as a light source. In traditional degradation testing, the photosensitive device would be photo-exposed under the bulbs and occasionally the performance of the panels would be sampled. These systems typically expose a photosensitive device to a 1 sun equivalent (1,000 W/m² light intensity) or even less for an extended period of time or even continuously for an extended period of time. A spectrum may further be defined according to the American Society for Testing and Materials (ASTM) AM1.5G standard. It is desirable to reduce the overall testing time and increase the accuracy of determining photosensitive device performance so as to decrease the cost of a photosensitive device design or configuration, decrease the time-to-market, offer extended warranties to customers, and determine return on investment.

The features and advantages of the present disclosure will be readily apparent to those skilled in the art. While numerous changes may be made by those skilled in the art, such changes are within the spirit of the invention.

SUMMARY

In accordance with the teachings of the present disclosure, disadvantages and problems associated with conventional photosensitive device degradation techniques may be reduced and/or eliminated. For example, one method for degradation testing of a photosensitive device comprises initializing one or more degradation testing parameters. The light intensity for a light source is set, wherein the light source exposes one or more photosensitive devices with light at the set light intensity. A pixel performance measurement is requested for a pixel of the one or more photosensitive devices, wherein each pixel of each photosensitive device is mapped to a unique address, and wherein the pixel performance measurement is requested based, at least in part, on a duration threshold. The pixel performance measurement is received and compared to a performance rating threshold. It is determined if the pixel has failed based, at least in part, on the comparison of the pixel performance measurement to the performance rating threshold. A testing indicator associated with the pixel is marked, wherein the testing indicator is indicative of the determination of the failure of the pixel. It is determined if further testing is needed, wherein the determination if further testing is needed is based, at least in part on the testing indicator associated with the pixel.

In one embodiment, if the pixel is determined to have failed, the photosensitive device associated with the pixel is also marked as failing or may be marked as failing in lieu of marking the individual pixel as failing. In one embodiment the photosensitive device associated with the pixel is marked as failed based, at least in part, on a pixel failure threshold.

In one embodiment, the light intensity is altered at a predetermined time interval until a light intensity threshold is reached. Performance measurements may be taken at each predetermined time interval or any other intervening or subsequent time interval.

In one embodiment, the pixel performance measurement is stored in a file associated with the substrate housing the photosensitive device associated with the pixel. The pixel performance measurement may be stored for each individual pixel tested or for any combination of pixels tested.

In one embodiment, the one or more of a temperature measurement, a humidity measurement, and an atmospheric measurement are requested and received. One or more of a temperature, a humidity, and an element of an atmosphere associated with the testing environment are altered based, at least in part, on one or more of the temperature measurement, the humidity measurement, and the atmospheric measurement.

In one embodiment the performance measurement is requested for each pixel at every specified interval until the duration threshold is reached.

In one embodiment, a system comprises one or more processors for processing information of the system, a memory of the system communicatively coupled to the one or more processors, and one or more modules that comprise instructions stored in the memory, the instruction, when executed by the one or more processors are operable to perform operations comprising one or more embodiments according the present disclosure.

In one embodiment, a system comprises a light source plate, wherein the light source plate emits light at an intensity level, a cell interface plate, a container proximate to the light source plate and coupled to the cell interface plate, wherein the container comprises one or more photosensitive devices and a thermoconductive compound adjacent to at least one side of the one or more photosensitive devices, wherein one or more pins associated with one or more pixels of the one or more photosensitive devices interfaces with the container, and wherein the container interfaces the one or more pins to the cell interface plate, a light metering device proximate to the light source plate, wherein the light metering device measures the intensity of emissions from the light source plate to the photosensitive devices, a light power source coupled to the light source plate, wherein the light power source controls one or more of current and voltage to the light source plate, a multiplexor coupled to the cell interface plate, wherein the multiplexor activates circuitry to address the one or more pixels, and a measuring device coupled to the multiplexor, wherein the measuring device receives one or more performance measurements associated with the one or more pixels.

In one embodiment, the light power source is a programmable power supply.

In one embodiment, the system further comprises a temperature metering device within the container, wherein the temperature metering device measures the temperature associated with the one or more photosensitive devices.

In one embodiment, the system further comprises a client is communicatively coupled to the light power source, the multiplexor and the measuring device.

In one embodiment, the system a photosensitive device test system, wherein the photosensitive device test system comprises the light source plate, the cell interface plate, and the container.

In one embodiments, the system further comprises one or more substrates within the container, wherein each of the one or more substrates comprises one or more photosensitive devices.

Other technical advantages of the present disclosure will be readily apparent to one of ordinary skill in the art from the following figures, description, and claims. Moreover, other specific advantages of particular surveying techniques and combinations are discussed below. Moreover, while specific advantages are explained in the present disclosure, various embodiments may include some, all, or none of those advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

The degradation of a photosensitive device may result in an unexpected failure of a power system and may be expensive to address if not known before installation. Thus, it is important to know the degradation rate of a photosensitive device. Testing may be useful and reduce overall expenses for a given design or configuration. The degradation rate for a given photosensitive device is inversely related to, for example, the power produced by the photosensitive device. That is, the higher the degradation rate, the less power produced over time. Also, the degradation rate is directly proportional to the failure rate. That is, the higher the degradation rate, the more likely it is that a given photosensitive device will fail. A photosensitive device may be considered to have failed when the photosensitive device has degraded by 20% of the photosensitive device's original performance metric. The failure threshold may be adjusted up or down according to the given criteria for a particular photosensitive device configuration or installation. While testing is important, it is also important to reduce the testing time to ensure prompt implementation of a new design or configuration or installation of a photosensitive device. As photosensitive devices may be designed to last for several years or even decades, accelerated degradation is needed to reduce overall expenses and improve performance. The present disclosure provides a system and method for providing accelerated degradation and performance measurement for a given photosensitive device.

The example embodiments herein may utilize a single information handling system local to a user. In certain embodiments more than one information handling system may be utilized. In other embodiments, one or more information handling systems may be remote, such as a server. In one or more embodiments, the methods and systems disclosed may be performed in conjunction with other photosensitive device degradation testing techniques. The teachings of the present disclosure are intended to encompass any combination of embodiments.

While specific advantages are discussed, various embodiments may include all, some, or none of the enumerated advantages. Embodiments of the present disclosure and its advantages are best understood by referring to FIGS. 1 through 4, wherein like numerals refer to like and corresponding parts of the various drawings.

Figure 1:
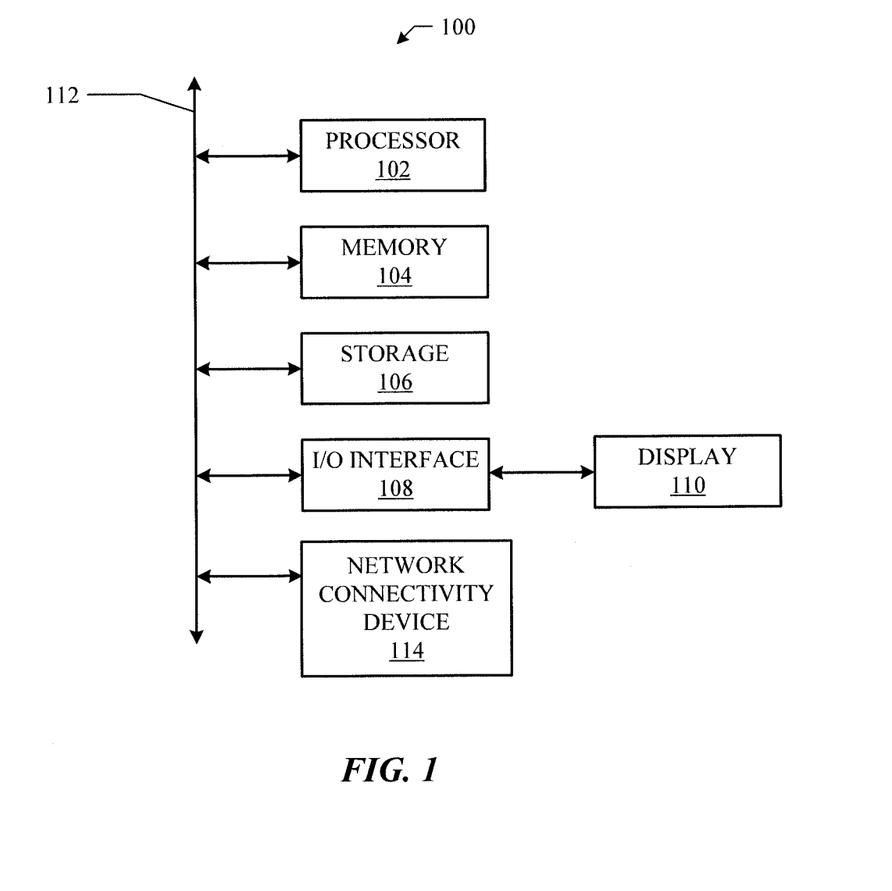
FIG. 1 is a block diagram illustrating an example information handling system according to one or more embodiments of the present disclosure.

FIG. 1 illustrates an example information handling system 100 for implementing one or more embodiments disclosed herein. The information handling system 100 may include one or more elements, components, instrumentalities, etc. or any combination thereof operable to perform any functionality for implementing any embodiment disclosed herein. An information handling system 100 may be an embedded information handling system, a system-on-chip (SOC), a single-board information handling system, a mainframe, an interactive device such as a kiosk, a client device, a server (for example, blade server or rack server), personal computer (for example, desktop or laptop), tablet computer, mobile device (for example, personal digital assistant (PDA) or smart phone), a consumer electronic device, a network storage device, printer, switch, router, data collection device, virtual machine, or any other suitable computing device known to one of ordinary skill in the art. In one or more embodiments, information handling system 100 may be a single information handling system 100 or may be multiple information handling systems 100, may be self-contained or distributed (for example, may span multiple data centers), may be hosted in a cloud, may be part of one or more other computing devices or may be any other suitable configuration known to one of ordinary skill in the art. Information handling system 100 may perform one or more operations in real-time, at timed intervals, in batch mode, at a single information handling system 100 or at multiple information handling systems 100, at a single location or multiple locations, or in any other sequence or way known to one of ordinary skill in the art.

The information handling system 100 may be any number of suitable components and is not limited to the number or the arrangement of components shown in FIG. 1. Information handling system 100 may include a processor 102, a memory 104, a storage 106, an input output (I/O) interface 108, a display 110, a bus 112, and a network connectivity device 114. Bus 112 may couple processor 102, memory 104, storage 106, I/O interface 108, and network connectivity device 114 to each other. Bus 112 may also couple any one or more of any other appropriate components of information handling system 100 to any other one or more components of information handling system 100. Bus 112 may include hardware, software or any combination thereof for coupling any one or more components of information handling system 100. Bus 112 may be any type of bus or combination of buses known to one of ordinary skill in the art.

Information handling system 100 may include a processor 102 that is in communication with memory devices memory 104 and storage 106. Processor 102 may be a general processing unit (GPU), a microprocessor, a central processing unit (CPU), multiple CPUs, single-core, dual-core, multi-core, or any other suitable processor known to one of ordinary skill in the art. Processor 102 may include one or more of internal read-only memory (ROM) (and any variation thereof), random access memory (RAM) (and any variation thereof), cache, internal registers, buffer, any other type of suitable storage component known to one of ordinary skill in the art, an arithmetic logic unit (ALU), and any other appropriate components known to one of ordinary skill in the art.

Processor 102 includes hardware for executing one or more instructions or modules, for example, a software program or computer program. It is understood that by programming and/or loading executable instructions onto the information handling system 100, at least one of the processor 102, memory 104, and storage 106 are changed, transforming the information handling system 100 in part into a particular machine or apparatus having the novel functionality taught by the present disclosure. It is fundamental to the electrical engineering and software engineering arts that functionality that can be implemented by loading executable software into an information handling system 100 can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Memory 104 may be internal or external to processor 102. Memory 104 may be RAM, dynamic RAM (DRAM), static RAM (SRAM) or any other suitable type of memory known to one of ordinary skill in the art. While only one memory 104 is shown, the present disclosure contemplates any number of memory 104. Memory 104 may include main memory for storing one or more instructions executed by processor 102. Information handling system may load one or more instructions from storage 106 or any other information handling system 100 to memory 104. Processor 102 may load one or more instructions from memory 104 to an internal memory of processor 102 for execution, for example, to an internal register or internal cache.

Storage 106 may include mass storage for data, one or more instructions, one or more modules, or any other type of suitable information known to one of ordinary skill in the art. Storage 106 may be a hard disk drive (HDD), floppy disk drive, flash memory, optical disc drive, magneto-optical disc drive, magnetic tape, universal serial bus (USB) drive, non-volatile solid-state memory, read-only memory (ROM), mask-programmed ROM, programmable ROM (PROM), erasable PROM (EPROM), electrically erasable PROM (EEPROM), electrically alterable ROM (EAROM), any other type of ROM known to one of ordinary skill in the art, flash memory, any other storage known to one of ordinary skill in the art, or any combination of two or more of these. Storage 106 may include one or more storage 106. Storage 106 is typically used for non-volatile storage and as overflow storage for memory 104. Storage 106 may store executable programs, such as software programs or computer programs which may be loaded into memory 104 when such programs are selected for execution. Memory 104 and storage 106 may be referred to in some contexts as computer readable storage media and/or non-transitory computer readable storage media.

Network connectivity device 114 may be any or more network connectivity devices 114 and may take the form of modems, modem banks, Ethernet cards, USB interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 114 may enable the processor 102 to communicate with the Internet or one or more intranets. With such a network connection, it is contemplated that the processor 102 might receive information from the network (for example, network 210 of FIG. 2), or might output information to the network in the course of performing the above-described method steps. Such information, which is often represented as a sequence of instructions to be executed using processor 102, may be received from and outputted to the network, for example, in the form of a computer data signal embodied in a carrier wave.

Such information, which may include data, instructions, or modules to be executed using processor 102, for example, may be received from and outputted to the network, for example, in the form of a computer data baseband signal or signal embodied in a carrier wave. The baseband signal or signal embodied in the carrier wave generated by the network connectivity device 114 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 102 executes instructions, codes, computer programs, scripts which it accesses from memory 104, storage 106 or the network connectivity device 114. While only one processor 102 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the storage 106, for example, hard drives, floppy disks, optical disks, and/or other device, ROM, and/or the RAM may be referred to in some contexts as non-transitory instructions and/or non-transitory information.

I/O interface 108 may be hardware, software, or any combination thereof. I/O interface 108 provides one or more interfaces for communication between information handling system 100 and one or more I/O devices. In one embodiment, I/O interface 108 couples to display 110 and may communicate information to and from display 110. While only a display 110 is shown, the present invention contemplates any number of internal or external I/O devices coupled to the I/O interface 108 such as one or more of video monitors, liquid crystal display (LCDs), touch screen displays, printers, keyboards, keypads, switches, dials, mice, track balls, voice recognizers, card readers, paper tape readers, thumb drives, hard disk drives, optical disk drives, microphones, video cameras, stylus, tablets, still cameras, speakers, sensors, or any other devices known to one of ordinary skill in the art. Information handling system 100 may also include one or more communication ports (not shown) for communicating with external devices. I/O interface 108 may also include one or more device drivers for any one or more I/O devices coupled to the information handling system 100.

In an embodiment, the information handling 100 may comprise two or more information handling systems 100 in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the information handling 100 to provide the functionality of a number of servers that is not directly bound to the number of information handling systems 100 in given configuration. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program or software product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the information handling system 100, at least portions of the contents of the computer program product to the storage 106, to the memory 104, and/or to other non-volatile memory and volatile memory of the information handling system 100. The processor 102 may process the executable instructions and/or data structures in part by directly accessing the computer program product, for example by reading from a CD-ROM disk inserted into a disk drive peripheral of the information handling system 100. Alternatively, the processor 102 may process the executable instructions and/or data structures by remotely accessing the computer program product, for example by downloading the executable instructions and/or data structures from a remote server through the network connectivity device 114. The computer program product may comprise instructions that promote the loading and/or copying of data, data structures, files, and/or executable instructions to the storage 106, to the memory 104, and/or to other non-volatile memory and volatile memory of the information handling system 100.

In some contexts, a baseband signal and/or a signal embodied in a carrier wave may be referred to as a transitory signal. In some contexts, the storage 106 and the memory 104 may be referred to as a non-transitory computer readable medium or a computer readable storage media. A dynamic RAM embodiment of the memory 104, likewise, may be referred to as a non-transitory computer readable medium in that while the dynamic RAM receives electrical power and is operated in accordance with its design, for example during a period of time during which the information handling system 100 is turned on and operational, the dynamic RAM stores information that is written to it. Similarly, the processor 102 may comprise an internal RAM, an internal ROM, a cache memory, and/or other internal non-transitory storage blocks, sections, or components that may be referred to in some contexts as non-transitory computer readable media or computer readable storage media.

Figure 2:
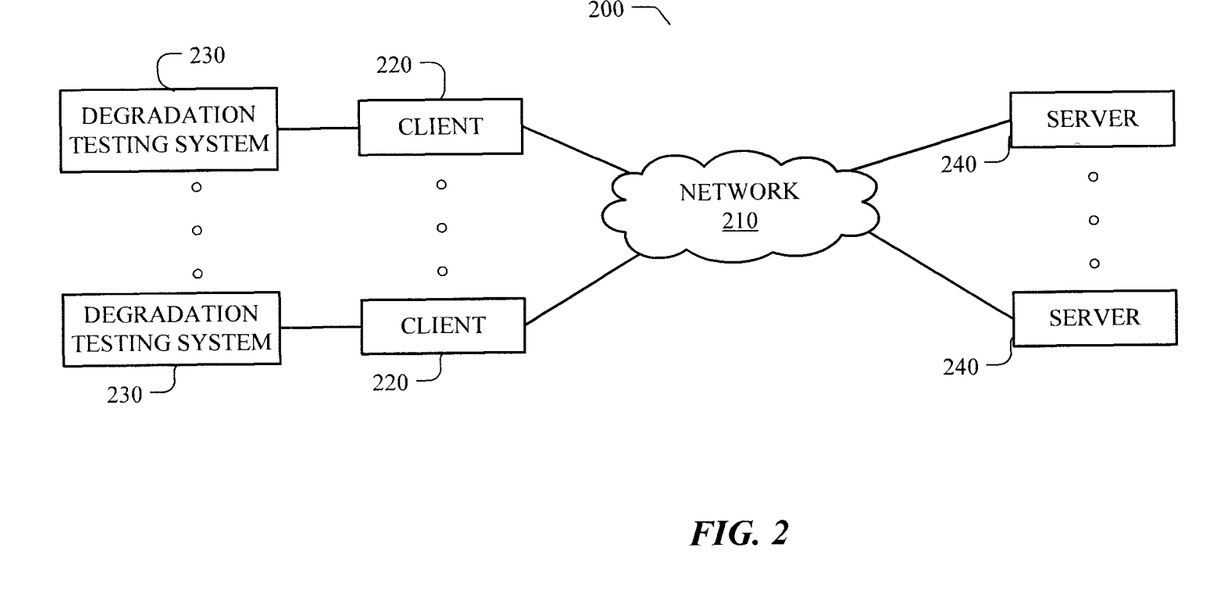
FIG. 2 is a block diagram illustrating an example network configuration according to one or more embodiments of the present disclosure.

FIG. 2 is a block diagram illustrating an example networked configuration for one or more information handling systems 100. In one embodiment, one or more clients 220 are coupled to one or more servers 240 via network 210. Network 210 may be a public network, private network, wireless network, local area network (LAN), wide-area network (WAN), the Internet, extranet, intranet, or any other network known to one of ordinary skill in the art. In one embodiment, network 210 may include one or more routers for routing information between one or more clients 220 and one or more servers 240.

Client 220 may be any type of information handling system 100. In one embodiment, client 220 may be a thin-client having limited processing and storage capabilities. Server 240 may be any type of information handling system 100. In one embodiment server 240 may be a virtual machine or a desktop session. One or more servers 240 may provide access to software and/or hardware to one or more clients 220. For example, a server 240 may provide access to a client 220 to a virtual device and/or a virtual application. Any one or more clients 240 may communicate with one or more servers 240 via any of one or more protocols known to one of ordinary skill in the art.

One or more clients 220 may be coupled to one or more degradation testing systems 230. While only one degradation testing system 230 is shown coupled to a given client 220, the present disclosure contemplates any one or more degradation systems 230 coupled to a single client 220 or to multiple clients 220. In one embodiment one or more degradation testing systems 230 may be coupled to the same one or more clients 230. It is contemplated by the present disclosure that any combination of degradation testing systems 230 may be coupled in any number of configurations to any one or more clients 220. In one or more embodiments, client 220 may communicate information received from any one or more degradation testing systems 230 via network 210 to any one or more servers 240.

Figure 3:
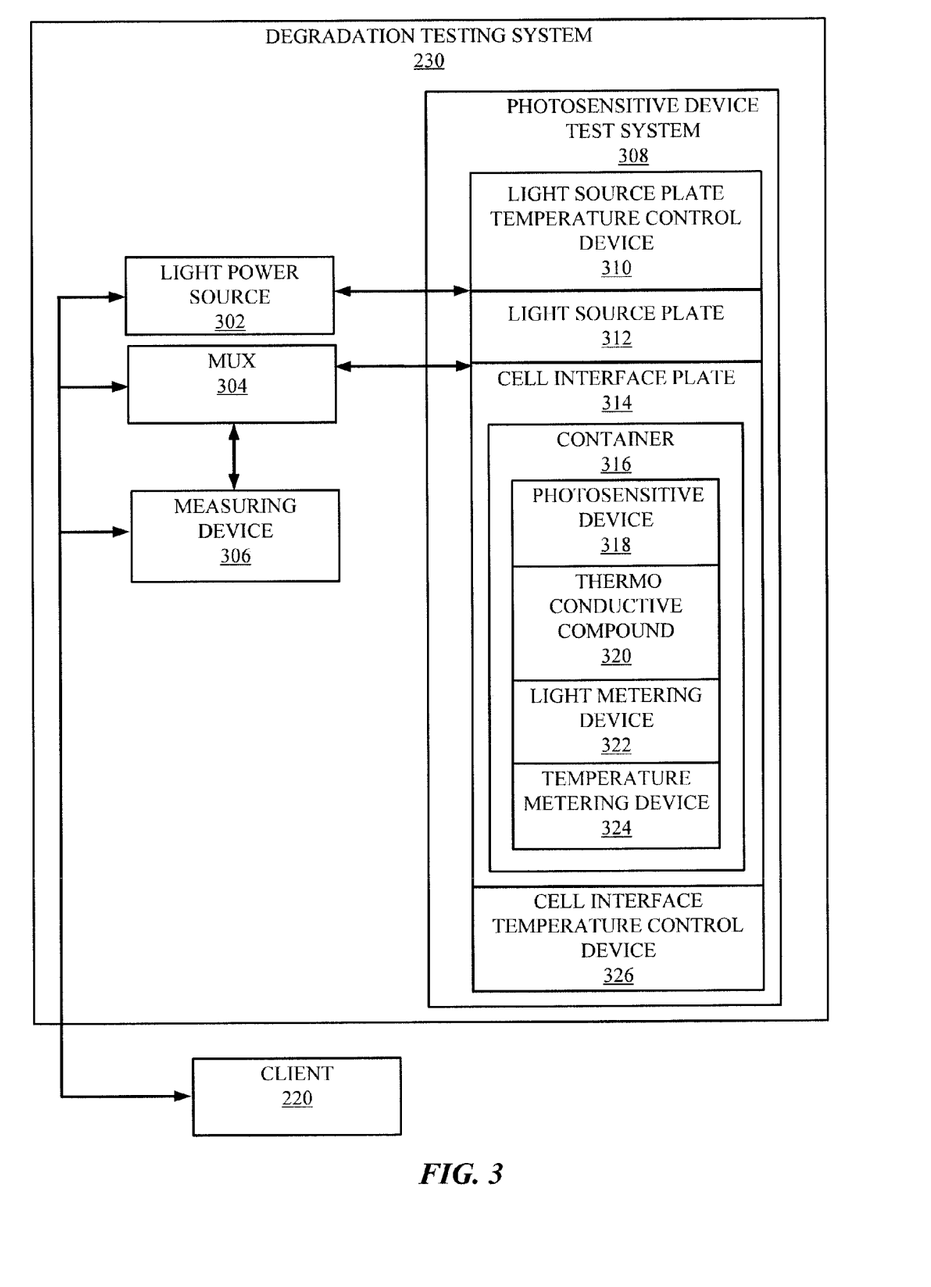
FIG. 3 is a block diagram illustrating an example degradation testing system according to one or more embodiments of the present disclosure.

FIG. 3 is a block diagram illustrating an exemplary degradation testing system 230 according to one or more embodiments of the present disclosure. While only certain components are depicted, the present disclosure contemplates that a degradation testing system 230 may comprise any number of components. While one or more components are depicted within degradation testing system 230, the present disclosure contemplates that any one or more of the components may be contained within a single structure or unit or within multiple structures or units.

A degradation testing system 230 provides an efficient way to test the degradation of photosensitive devices. Degradation testing system 230 may comprise a light power source 302, a multiplexor (mux) 304, an electrical source measure device (or measuring device) 306, and a photosensitive device test system 308. In one or more embodiments, light power source 302, mux 304, measuring device 306, and photosensitive device test system 308 may be separate devices or within a single device, housed within one or more racks or within a single rack, or any combination thereof.

Light power source 302 may be a programmable power supply which allows for controlling one or more of current, voltage, time stamps, or any other parameters associated with supplying power to one or more light sources. In one embodiment, light power source 302 may be a Keithley 2231A-30-3 Triple Channel DC Power Supply, any other light power source 302 known to one of ordinary skill in the art, or any combination of light power sources 302. Light power source 302 controls the light intensity emitted by the light source plate 312. Light power source 302 may have one or more local controls to allow a user to adjust (manually, automatically, or programmatically) any one or more parameters of the light power source 302. Light power source 302 may be coupled to client 220 to allow for bi-directional communication between light power source 302 and client 220. Any of the one or more parameters associated with the light power source 302 may be controllable by client 220. Light power source 302 may transmit values for any of the one or more parameters to the client 220. Based, at least in part, on the one or more parameters associated with the light power source 302, client 220 may alter any of the one or more parameters associated with the light power source 302. For example, any one or more of the one or more parameters may be compared to a threshold value and based, at least in part, on that comparison, the client 220 may communicate to the light power source 302 a command to alter or change one or more of these parameters. For example, client 220 may receive a parameter indicative of the voltage level being output by the light power source 302 and that parameter may be compared with a predefined threshold or limit whereupon client 220 may send a command to the light source 302 to adjust the voltage so as to attain the threshold (such as sending a command to the light power source 302 to either increase, decrease, or maintain the current voltage level).

Degradation testing system 230 may also include a mux 304. The mux 304 is a multiplexor for multiplexing the pixels of photosensitive device 318 to a coupled measuring device 306. In one embodiment, the mux 304 may be an Agilent 34792 or any other suitable switch unit known to one of ordinary skill in the art. In one embodiment the measuring device 306 may be a Keithley 2450 source meter unit or any other measuring device known to one of ordinary skill in the art. The measuring device 306 may only measure one pixel of a photosensitive device 318 at a time. The measuring device 306 may send a signal or command to the mux 304 requesting information or a measurement for a selected pixel. In response, the mux 304 sends the measurement associated with a selected pixel to the measuring device 306. In such a manner, each pixel of each photosensitive device 318 may be tested. While only one mux 304 is shown, any number of muxes 304 may be utilized according to the number of inputs allowed by the mux 304 and the number of pixels of photosensitive devices 318 required to be measured. In one embodiment, a first set of muxes 304 (where a set may be one or more) may be coupled to a first measuring device 306 while a second set of muxes (where a set may be one or more) may be coupled to a second measuring device 306. Any combination of muxes 304 and measuring devices 306 may be utilized according to the specific requirements of a given testing configuration.

The mux 304 and the measuring device 306 are also coupled to the client 220. The client 220 communicates to the mux 304 the particular pixel of a photosensitive device 318 selected for testing (the pixel of photosensitive device 318 for measuring). For example, the client 220 may communicate to the mux 304 to close or open one or more relays associated with the mux 304 so as to complete, open or other otherwise connect the necessary circuitry associated with the selected pixel. The client 220 may then request a measurement for the selected pixel from the measuring device 306.

The degradation testing system 230 may also include a photosensitive device test system 308. Photosensitive device test system 308 includes the components necessary to source, house, cool, maintain, access, communicate with, or perform any other operations for the photosensitive device 318 designated or selected for testing. For example, photosensitive device test system 308 may include a light source plate temperature control device 310, light source plate 312, cell interface plate 314, container 316, and cell interface temperature control device 326. While light source plate temperature control device 310, light source plate 312, cell interface plate 314, container 316, and cell interface temperature control device 326 are shown within photosensitive device test system 308, any one or more may be external to photosensitive device test system 308.

Light source plate temperature control device 310 heats, cools, or both heats and cools the light source plate 312 and subsequently any light sources mounted thereon. In one embodiment, the thermoconductive compound 320 is a dielectric material. In one embodiment the thermoconductive compound 320 is one of thermally-conductive grease or epoxy, carbon nano tubes, graphite, carbon black, CHO-THERM pads, any other suitable thermoconductive material known to one of ordinary skill in the art, or any combination thereof.

The light source plate temperature control device 310 may be a thermoelectric cooler, a water circulating bath, dry ice, flame, any source that provides heating or cooling as known to one of ordinary skill in the art, or any combination thereof. In one embodiment, the light source plate temperature control device 310 is external to the photosensitive device test system 308. In one embodiment, the light source plate temperature control device 310 couples to an external source that controls the temperature of the light source plate 312. The light source plate temperature control device 310 is generally in close enough proximity to light source plate 312 to provide the required heating/cooling.

Light source plate 312 provides a mounting surface for the light source, such as for one or more bulbs. Light source plate 312 is coupled to light power source 302. Light source plate 312 may include one or more light sources. The one or more light sources may be any device that produces photons. For example, the light source may be fluorescent, incandescent, laser, thermo ionic emitter, light emitting diode (LED), or any other type of light source known to one of ordinary skill in the art. In one embodiment, one or more LED bulbs are utilized as the light source as the intensity may be modulated by only changing the power wattage input. The light source plate 312 intensity is typically measured in a unit of measurement known as a sun equivalent (for example, 1,000 W/m$^2$) but any other applicable unit of measurement known to one of ordinary skill in the art may also be used. Light power source 302 may send a signal or command to light source plate 312 to increase or decrease the intensity of light source plate 312. For example, the intensity may be altered in increments of 1 sun or a partial sun. In one embodiment, the photosensitive device 318 is exposed to an emission of 10 sun equivalents from light source plate 312.

Cell interface plate 314 may include a container 316. Container 316 may be a chuck, holder, or any other container for housing or supporting a photosensitive device 318 such that photosensitive device 318 is exposed to emissions from the light source plate 312. The photosensitive device 318 may be any one or more of photovoltaics (PVs), solar cells, photodiodes, photoresistors, photocapacitors, phototransducers, phototransistors, any other photosensitive device known to one of ordinary skill in the art, or any combination thereof. Photosensitive device 318 may include any number of individual photosensitive devices (also herein referred to as 'pixels') according to a given configuration. The container 316 may be constructed of a thermoconductive material, for example, aluminum. The container 316 includes pins that mate to form an electrical connection with the pads of the photosensitive devices 318. A lid may be placed on top of the container 316 to provide stability and to apply a pressure to the photosensitive device 318 to ensure that the pads of the photosensitive device 318 electrically connect to the pins of the container 316. While only certain components are shown, the present disclosure contemplates that container 316 may include any number of components known to one of ordinary skill in the art.

The photosensitive device 318 sits on or above a thermoconductive compound 320 to provide heat transfer. While thermoconductive compound 320 is depicted below photosensitive devices 318, the present disclosure contemplates that the thermoconductive compound 320 may be above or below, completely surround, or any combination thereof the photosensitive devices 318. For example, in one embodiment, a thermoconductive compound 320 may be above and below photosensitive device 318.

Photosensitive device 318 may include one or more substrates where each substrate includes one or more individual photosensitive devices. In one embodiment, the photosensitive device 318 includes four substrates with six individual photosensitive devices per substrate. In one embodiment, photosensitive device test system 308 includes multiple containers 316 and each container 316 may include multiple substrates within each photosensitive device 318. In one embodiment, photosensitive device test system 308 includes four containers 316, each having a photosensitive device 318 where photosensitive device 318 includes four substrates with six individual photosensitive devices per substrate for a total of ninety-six individual photosensitive devices.

Light metering device 322 measures the intensity of the emission from light source plate 312. The light metering device 322 may be a photo diode, thermistor, any light measuring device 322 known to one of ordinary skill in the art, or any combination thereof. Light metering device 322 measures any fluctuations of the performance of the light intensity from the light source plate 312. The fluctuations of the performance of the configuration of photosensitive devices 318 may be due to fluctuations of the performance of the photosensitive devices 318 themselves or to fluctuations of the light source plate 312. While light metering device 322 is depicted within the container 316, the present disclosure contemplates light metering device 322 being external to the container 316. The light metering device 322 may communicate one or more light intensity measurements based, at least in part, on one or more light intensity measurement criteria for the testing configuration. For example, the light metering device 322 may communicate one or more light intensity measurements to the mux 304 based, at least in part, on a request for a light intensity measurement from the mux 304, a timed interval, an interrupt, a manual command or input by a user, a determination that a threshold or a range has been exceeded (above or below), any other criteria known to one of ordinary skill in the art, or any combination thereof. While light metering device 322 is depicted within container 322, the present disclosure contemplates light metering device 322 being external to the container 316 but proximate to the light source plate 312 such that light metering device 322 can accurately measure the light intensity exposed to the photosensitive devices 318. Light metering device 322 may be any distance from the light source plate 312 but for accurate measurement must be within the tolerance for measuring emissions from the light source plate 312 exposed to the photosensitive device 318. In one embodiment, light metering device 322 is coupled to a photosensitive device 318 on either side of thermoconductive compound 320. In one embodiment, light metering device 322 is in between photosensitive devices 318 and light source plate 312 but does not obstruct any light or degrade the light intensity of light source 312 to photosensitive devices 318.

Temperature metering device 324 monitors the temperature of the photosensitive devices 318. While temperature metering device 324 is shown within the container 316, the present disclosure contemplates that temperature metering device 324 may be external to the container 316, within the photosensitive device test system 308 or external to the photosensitive device test system 308. The temperature metering device 324 is in close proximity to the photosensitive devices 318 so as to provide an accurate measurement of the photosensitive devices 318 where the proximity may be determined based, at least in part, on the sensitivity of the temperature metering device 324, the accuracy required of the testing configuration, the type of photosensitive devices 318, or any other criteria known to one of ordinary skill in the art. The temperature metering device 324 communicates via an interface of the cell interface plate 314 to the mux 304. The temperature metering device 324 may communicate one or more temperature measurements based, at least in part, on one or more temperature measurement criteria for the testing configuration. For example, the temperature metering device 324 may communicate one or more temperature measurements to the mux 304 based, at least in part, on a request for a temperature measurement from the mux 304, a timed interval, an interrupt, a manual command or input by a user, a determination that a threshold or a range has been exceeded (above or below), any other criteria known to one of ordinary skill in the art, or any combination thereof.

The photosensitive device test system 308 may also include a cell interface temperature control device 326. The cell interface temperature control device 326 controls the temperature of the cell interface plate 314 and the container 316 including the photosensitive device 318. The cell interface temperature control device 326 may be a thermoelectric cooler, a water circulating bath, dry ice, flame, any source that provides heating or cooling as known to one of ordinary skill in the art, or any combination thereof. In one embodiment, the cell interface temperature control device 326 is external to the photosensitive device test system 308. In one embodiment, the cell interface temperature control device 326 couples to an external source (for example, programmable logic controller and power supply) that controls the temperature of the cell interface plate 314. Cell interface temperature control device 326 is generally in close proximity to cell interface plate 314 so as to provide the specified or required heating and/or cooling.

Figure 4:
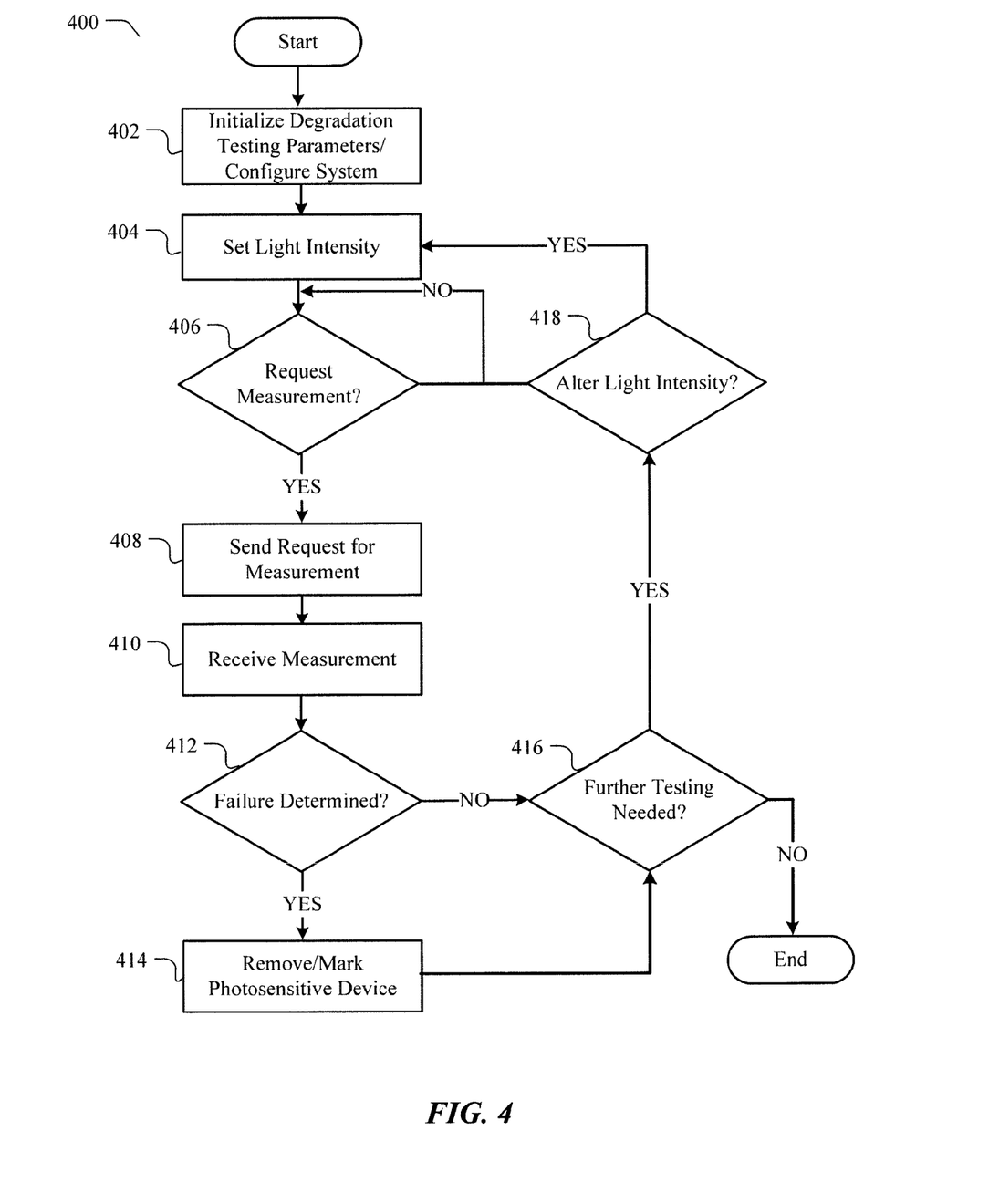
FIG. 4 is a flowchart illustrating an example method for a test degradation system according to one or more embodiments of the present disclosure.

FIG. 4 is a flowchart illustrating an example method 400 for a degradation testing system 230. At step 402, the degradation testing system 230 is initialized and configured. One or more degradation testing parameters or configurations may be initialized or set at client 220. The degradation testing parameters or configurations may be indicative of the configuration and type of testing for the degradation testing system 230. One or more of the degradation testing parameters or configurations may be initialized via a graphical user interface (GUI), a command-line interface (CLI), automatically via an expert system that polls one or more components of the degradation testing system 230, for example photosensitive devices 318, or any combination thereof, or any other way known to one of ordinary skill in the art. The one or more degradation testing parameters or configurations may be initialized or set by a user or automatically by one or more other clients 220 or severs 240. In one embodiment, a user remotely logs in to the client 220 (shown in FIG. 3) and sets or initializes the one or more degradation testing parameters. In another embodiment, a user locally sets or initializes the one or more degradation testing parameters at the client 220 (shown in FIG. 3). In one or more embodiments, client 220 (shown in FIG. 3) is local to the degradation testing system 230. In one or more embodiments, client 220 (shown in FIG. 3) is remote to the degradation testing system 230.

In one embodiment the degradation testing parameters may include a photosensitive device pin lookup table. The photosensitive device pin lookup table may include unique entries or an address map for each individual photosensitive device 318. Each pin of each individual photosensitive device of photosensitive devices 318 may have a unique address that is stored in the photosensitive device pin lookup table. The photosensitive device pin lookup table may be a flat file, a database, a linked list, an addressed value stored in a memory location (such as memory 104 or storage 106), any other suitable form known to one of ordinary skill in the art, or any combination thereof. The photosensitive device pin lookup table may be initialized by a user via a graphical user interface (GUI), a command-line interface (CLI), automatically via an expert system that polls each individual photosensitive device of photosensitive devices 318, the degradation testing system 230, or any combination thereof, or any other way known to one of ordinary skill in the art for obtaining the identification or addresses for each individual pin of an individual photosensitive device of photosensitive devices 318. The photosensitive device pin lookup table may correlate to the wiring from the mux 304 to each pin of each photosensitive device of the photosensitive devices 318.

Also at step 402, one or more degradation testing thresholds may be set. The one or more degradation testing thresholds may include one or more of photosensitive device failure threshold, a pixel performance rating, pixel failure threshold, light intensity threshold, light intensity time interval, a temperature threshold, a humidity threshold, a voltage threshold, a current threshold, an atmospheric threshold (for example, set levels for oxygen, nitrogen, argon, or any other atmospheric criteria known to one of ordinary skill in the art), a testing duration threshold (for example, 1 day, 10 days, or any other suitable unit of measurement known to one of ordinary skill in the art) or any other thresholds or combinations thereof known to one of ordinary skill in the art. For example, the degradation testing system 230 may be configured to test photosensitive devices 318 at a predefined baseline light intensity threshold of 1 sun so as to establish a baseline. In another example, after a baseline is established, the degradation testing system 230 may be configured to test photosensitive devices 318 at a light intensity threshold of 10 suns.

Also at step 402, the degradation testing system 230 may be configured to obtain one or more types of measurements over a range of data points and at a specified interval within that range. In one embodiment, the range is set to −0.2 Volts to +1.3 Volts by the measure device 306 with performance measurements of photosensitive devices 318 taken at each 0.1 V interval. An interval duration may also be associated with each interval. In one embodiment the interval duration may be based on a frequency such that measurements are taken at a time period measured in Hertz. In another embodiment, the duration of an interval may also be measured in days or any other suitable unit of measurement known to one of ordinary skill in the art. The scan direction may also be specified such that the measurements are taken beginning at a negative voltage to positive voltage or a positive voltage to a negative voltage.

At step 402, one or more other configurations or parameters that may be initialized or set may include the number of degradation testing systems 230, the number of containers 316 within each degradation testing system 230, the number of photosensitive devices 318 within each container 316, the number of individual photosensitive devices within each photosensitive devices 318, the process used to create each individual photosensitive device of photosensitive devices 318, a file name or other unique identifier for each individual substrate, identification of which pins of each individual photosensitive device of each photosensitive devices 318 will be measured (or tested), testing temperature, testing atmosphere (for example, water vapor, air, pure nitrogen, pure oxygen, pure argon, etc., or any combination thereof) and any other parameters known to one of ordinary skill in the art.

At step 404, the light intensity is set based, at least in part, on the light intensity threshold (or if a baseline, the baseline light intensity threshold). In one embodiment, client 220 sends a command to the light power source 302 (for example, a programmable power source) to output a particular voltage or current to the light source plate 312. The command may be based on any one or more of the degradation testing parameters. For example, in one embodiment a light intensity threshold is set to 10 suns and the duration for testing at 10 suns is set to every 10 days with an interval set to adjust the light intensity to 1 sun and to maintain the 1 sun light intensity during the photosensitive device 318 testing cycle, and returned to 10 suns upon testing cycle completion. In this embodiment, the client 220 sends a corresponding voltage or current command to the light power source 302 so as to set the light intensity of the light source plate 312 to the required level.

At step 406 it is determined if a measurement should be requested. For example, one or more of the degradation testing parameters may indicate when a measurement is requested, a user may request a measurement or client 220 may request a measurement based on any number of criteria, degradation testing parameters, or any combination thereof. In one embodiment, it is determined if a specific interval has passed or a duration has been reached. For example, the degradation testing system 230 may be configured to take a performance measurement of any one or more pixels of the photosensitive devices 318 at the expiration of a certain time interval or duration. For example, performance measurements (or any other requested measurements) may be taken daily, twice a day, after the expiration of a timer (for example, at the expiration of a set time period), as a result of an interrupt, or based on any other interval of time. The interval of time may be stored as a duration threshold or an interval threshold such that when the threshold is exceeded, an interrupt is triggered, or client 220 may continuously poll to determine if the threshold has been exceeded, or by any other way known to one of ordinary skill in the art. If one or more degradation system parameters or conditions are not met such that a measurement is not requested, the system may continuously loop at 406. The process may spawn a separate thread to continuously poll for an interrupt or any other indication that on one or more of the degradation system parameters or conditions (for example, a duration threshold or an interval threshold) have been met. Such polling need not be performed in a separate thread but rather may be performed in a single thread or in any manner known to one of ordinary skill in the art.

In one embodiment, a measurement may be requested of the performance of one or more pixels (corresponding to an individual pin) of one or more individual photosensitive devices of photosensitive devices 318 for any of the one or more containers 316 as described above with respect to FIG. 3. A measurement may be requested for any measurable degradation testing system condition including any condition associated with any one or more degradation testing parameters. For example, in addition to obtaining a measurement of a pixel, the humidity, temperature, atmosphere, or any other suitable condition may be measured. The one or more conditions may be measured separately from the performance of a given pixel. For example, client 220 may request measurements or automatically receive measurements for one or more conditions utilizing one or more measuring devices including, but not limited to, measuring device 306, temperature metering device 324, and light metering device 322. One or more conditions may be associated with each type of requested measurement. For example, a performance measurement for a particular pixel may have an associated duration threshold, an interval threshold, a range threshold, or any other suitable condition known to one of ordinary skill in the art. Step 406 determines if any such associated conditions have been met before requesting that the specified measurement be requested.

If a measurement is requested, then at step 408, client 220 sends a request for the particular measurement to the appropriate device. For example, client 220 sends a request for a performance measurement for a particular pixel. The request (or command) is sent to mux 304. The request may be based, at least in part, on an address of the pixel (that corresponds to a particular pin of an individual photosensitive device of photosensitive device 318) to be measured where the address may be obtained from the photosensitive device pin lookup table, identification of the container 316, the identification of the substrate containing the particular pixel of interest, the identification of the individual photosensitive device within the photosensitive devices 318, an identification of the particular degradation testing system 230, or any other criteria or identifier known to one of ordinary skill in the art. The mux 304 makes the appropriate electrical connections so as to receive the performance measurement associated with the identified pixel.

At step 410, the mux 304 based, at least in part, on the address received from the client 220 obtains a performance measurement for the identified pixel. For example, typically a voltage across a range is applied to the photosensitive device 318 (or to an individual photosensitive device of photosensitive device 318) by the measurement device 306 via mux 304 and the current generated at each interval is measured by the measurement device 306 via mux 304. These measurements may then be used to generate a current/voltage (or I-V) curve from which all information may be derived. For example, resistance, maximum power, capacitance, open-circuit voltage, short-circuit current, or any other related information known to one of ordinary skill in the art may be derived. In one embodiment, the measuring device 306 may convert the performance measurement to a form suitable for consumption by client 220 and communicates the result to the client 220. In one embodiment, the measuring device 306 communicates the performance measurement via one or more suitable interfaces, components or devices to the client 220. In one embodiment, the client 220 stores the measurement in the substrate file associated with the measured pixel. The measurement may be stored as an entry in a flat file, a database, a linked list, an addressed value stored in a memory location (such as memory 104 or storage 106), any other suitable manner known to one of ordinary skill in the art, or any combination thereof.

At step 412, the client 220 determines based, at least in part, on the result received from step 410 for the performance measurement if a failure of an individual photosensitive device of photosensitive device 318 has occurred. If no photosensitive device failure has occurred, the process continues at step 416. A photosensitive device failure may be determined based, at least in part, on the performance measurement of any one or more pixels of the particular photosensitive device. For example, if the performance measurement of any one or more pixels falls below a certain pixel performance rating (for example, below a certain percentage) then the particular photosensitive device may be determined to have failed. In one example, the pixel failure threshold is set to one such that if one pixel does not meet the specified pixel performance rating, the entire individual photosensitive device is determined to have failed. In another embodiment, the pixel failure threshold is a specified number or percentage of pixels and once that threshold is met a particular photosensitive device is determined to have failed.

If it is determined at step 412 that a particular photosensitive device or pixel has failed, the photosensitive device or the pixel may be marked with a testing indicator at step 414 such that no further testing is performed on that particular photosensitive device or pixel within photosensitive devices 318. The testing indicator may be a single bit where one setting is indicative of a failure and another setting is indicative of a pass, a non-failure, or that testing should continue for the particular pixel or photosensitive device. In another embodiment, a user is notified that a particular photosensitive device has failed and needs to be replaced. A user may be notified via an electronic mail, a GUI, a CLI, a warning message, an alarm, an light indicator, or any other way known to one of ordinary skill in the art. In one embodiment, the failure is recorded in the substrate file associated with the particular photosensitive device.

At step 416 it is determined if further testing of any of the one or more degradation testing systems should continue. For example, the determination of step 416 may be made based, at least in part, on the number of failed pixels, the number of particular photosensitive devices marked as failures, or any other degradation testing thresholds or any combination thereof. In one or more embodiments, the process may end if the number of individual photosensitive devices of photosensitive device 318 exceeds the photosensitive device failure threshold. For example, in one embodiment the photosensitive device failure threshold may be set to one such that even if more than one photosensitive device is included within photosensitive devices 318 if a single photosensitive device fails the test ends. In one or more embodiments, two or more degradation testing systems 230 exist such that even if testing for one degradation testing system 230 ends the others may continue. Whether to continue testing may be based, at least in part, on one or more of a duration threshold (for example, testing may end at the expiration of a predetermined time limit), suitability of the testing environment (for example, testing may end if the humidity, temperature, atmosphere, etc. are not at acceptable levels), pixel failure rate, photosensitive device failure rate, number of photosensitive devices marked as failures, number of pixels marked as failures, user input (for example, the user via a GUI, CLI, or other input indicates whether the testing should continue), one or more evaluations of one or more measured parameters, or any other criteria known to one of ordinary skill in the art.

If at step 416, further testing is determined to be needed, then at step 418 it is determined whether the light intensity should be altered. For example, when obtaining a baseline, the light intensity may initially be set and maintained or held at the initial level for the duration of the baseline test. If the light intensity does not need to be altered the process continues at step 406. If the light intensity does need to be altered the process continues at step 404. The alteration of the light intensity may be determined based, at least in part on any one or more of a light intensity time interval, a light intensity threshold, at certain measurement intervals (for example, after each measurement, after each second measurement, etc.), duration intervals, or any other suitable parameter known to one of ordinary skill in the art.

In one embodiment, at step 418 any other configurations associated with the degradation testing system 230 may also be altered. For example, it may be determined that the temperature, humidity, atmosphere, or any other condition of the degradation testing system 230 environment should be altered.

In one embodiment, the process shown at 400 is exercised to obtain a baseline measurement. The baseline measurement may be established using any one or more degradation testing threshold parameters and one or more values for the degradation testing threshold parameters. For example, a baseline may be run for a duration of 1 day with a light intensity threshold of 1 sun. Subsequent to establishing a baseline measurement, the process shown at 400 may be ran in normal operation for any given period of time and for any light intensity threshold (for example, 10 days at a light intensity of 10 suns). In one or more embodiments, client 220 may shut down the testing of degradation testing system 230 based on any one or more alarms. The one or more alarms may be based, at least in part, on any one or more of a smoke detector, a carbon monoxide detector, a temperature measurement, a humidity measurement, an atmospheric measurement, a voltage measure, a current measurement, a power measurement, a vibration detector (for example, a device that detects vibration or movement in the structure housing the degradation testing system 230, for example, vibrations due to an earthquake), a short circuit, an open circuit, or any other alarm known to one of ordinary skill in the art.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented entirely with hardware or entirely with software (including firmware, modules, instructions, micro-code, etc.) or with any combination of hardware and software. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device, such as an information handling system, selectively activated or reconfigured by a computer program stored in the information handling system. Such a computer program may be stored in a tangible computer readable storage medium or any type of media suitable for storing electronic instructions, and coupled to an information handling system bus. Furthermore, any computing systems referred to in the specification may include a single processor or may be architectures employing multiple processor designs for increased computing capability.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A system comprising:
a light source plate, wherein the light source plate emits light at an intensity level;
a cell interface plate;
a container proximate to the light source plate and coupled to the cell interface plate, wherein the container comprises one or more photosensitive devices and a thermoconductive compound adjacent to at least one side of the one or more photosensitive devices, wherein one or more pins associated with one or more pixels of the one or more photosensitive devices interfaces with the container, and wherein the container interfaces the one or more pins to the cell interface plate;
a light metering device proximate to the light source plate, wherein the light metering device measures the intensity of emissions from the light source plate to the photosensitive devices;
a light power source coupled to the light source plate, wherein the light power source controls one or more of current and voltage to the light source plate;
a multiplexor coupled to the cell interface plate, wherein the multiplexor activates circuitry to address the one or more pixels; and
a measuring device coupled to the multiplexor, wherein the measuring device receives one or more performance measurements associated with the one or more pixels.

2. The system of claim 1, wherein the light power source is a programmable power supply.

3. The system of claim 1, further comprising:
a temperature metering device within the container, wherein the temperature metering device measures the temperature associated with the one or more photosensitive devices.

4. The system of claim 1, further comprising:
a client communicatively coupled to the light power source, the multiplexor and the measuring device.

5. The system of claim 1, further comprising:
a photosensitive device test system, wherein the photosensitive device test system comprises the light source plate, the cell interface plate, and the container.

6. The system of claim 1, further comprising:
one or more substrates within the container, wherein each of the one or more substrates comprises one or more photosensitive devices.

* * * * *